(12) United States Patent
Namboodiri et al.

(10) Patent No.: US 10,530,705 B2
(45) Date of Patent: Jan. 7, 2020

(54) ARCHITECTURE CUSTOMIZATION AT USER APPLICATION LAYER

(71) Applicants: Vipin Namboodiri, Karnataka (IN); Venugopal Baswaraju, Karnataka (IN); Manuswath K. Bhat, Karnataka (IN)

(72) Inventors: Vipin Namboodiri, Karnataka (IN); Venugopal Baswaraju, Karnataka (IN); Manuswath K. Bhat, Karnataka (IN)

(73) Assignee: Ricoh Co., Ltd., Tokyo (JP)

( * ) Notice: Subject to any disclaimer, the term of this patent is extended or adjusted under 35 U.S.C. 154(b) by 225 days.

(21) Appl. No.: 15/067,088

(22) Filed: Mar. 10, 2016

(65) Prior Publication Data

US 2017/0264566 A1    Sep. 14, 2017

(51) Int. Cl.
*H04L 12/927* (2013.01)
*H04L 29/08* (2006.01)

(52) U.S. Cl.
CPC ............ *H04L 47/803* (2013.01); *H04L 67/22* (2013.01)

(58) Field of Classification Search
CPC ..................................................... H04L 67/22
See application file for complete search history.

(56) References Cited

U.S. PATENT DOCUMENTS

| | | | |
|---|---|---|---|
| 7,590,550 B2 | 9/2009 | Schoenberg | |
| 2003/0120593 A1* | 6/2003 | Bansal | G06F 17/30873 705/39 |
| 2005/0248804 A1* | 11/2005 | Goel | G06F 3/1205 358/1.15 |
| 2007/0106541 A1* | 5/2007 | Raisanen | G06F 8/45 705/7.11 |
| 2009/0300116 A1* | 12/2009 | Ramarao | G06Q 10/10 709/206 |
| 2010/0049740 A1* | 2/2010 | Iwase | G06F 19/321 705/7.27 |
| 2012/0096463 A1* | 4/2012 | Agarwal | G06Q 10/06 718/100 |
| 2013/0226670 A1* | 8/2013 | Hernandez | G06Q 10/067 705/7.36 |
| 2014/0317172 A1* | 10/2014 | Granshaw | H04L 67/1008 709/203 |
| 2015/0201003 A1 | 7/2015 | King | |

(Continued)

OTHER PUBLICATIONS

Extended European Search Report for EP Application No. 17167532.7 dated Jul. 19, 2017, 9 pages.

*Primary Examiner* — Jason D Recek
(74) *Attorney, Agent, or Firm* — Patent Law Works LLP

(57) ABSTRACT

The disclosure includes a system and method for allocating a workflow for an application between a server and a client based on user context in usage of the application, and customizing user views based on the execution of the workflow. A customization module receives user input, identifies a type of an application based on the user input, determines a workflow for the application, partitions the workflow to a first portion of the workflow executed on a client and a second portion of the workflow executed on a server, and generates one or more user interfaces corresponding to the execution of the first portion of the workflow, wherein the execution of the first portion of the workflow on the client is based on the execution of the second portion of the workflow on the server.

19 Claims, 10 Drawing Sheets

(56) References Cited

U.S. PATENT DOCUMENTS

2016/0048696 A1* 2/2016 Follis ................. G06F 21/6209
                                                              726/28
2016/0371616 A1* 12/2016 Nicholas ............. G06F 11/0751
2017/0124507 A1* 5/2017 Nagaralu ............... G06Q 10/00

* cited by examiner

ARCHITECTURE CUSTOMIZATION AT USER APPLICATION LAYER

BACKGROUND

1. Field of the Invention

The specification generally relates to deployment and operation of user applications in a client-server environment. In particular, the specification relates to a system and method for allocating a workflow for an application between a server and a client based on a user context determined by usage of the application, and customizing user views based on the execution of the workflow.

2. Description of the Background Art

Telemedicine provides healthcare solutions for patients that are geographically separated from care-givers. As the healthcare space grows rapidly, telemedicine systems face many challenges. Since there are multiple governing authorities and geographically applicable guidelines mandated for solutions built in the healthcare space, the technical architecture of a telemedicine system needs to provide unified support for these guides. Also the telemedicine architecture should evolve to take advantage of the growing computational power and innovation happening of the end-user client devices. Other challenges of implementing a telemedicine system architecture include adapting to diversity and rapid changes of workflows of applications or services, building easy-to-use functional features for end-users to aggregate applications or services seamlessly, integrating a wide array of medical devices, and ease of maintenance.

SUMMARY

The techniques introduced herein overcome the deficiencies and limitations of the prior art, at least in part, with a system and method for allocating a workflow for an application between a server and a client, based on user context determined by usage of the application, and customizing user views based on the execution of the workflow. The system is configured to receive user input and identify a type of an application based on the user input. The system is further configured to determine a workflow for the application. The system is further configured to identify a plurality of core capabilities for performing the workflow for the application, wherein the plurality of core capabilities include a foundation component, a domain component, and a view component. The system is further configured to transmit the core capabilities to a client for performing the workflow for the application and receive, from the client, a result of the workflow.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
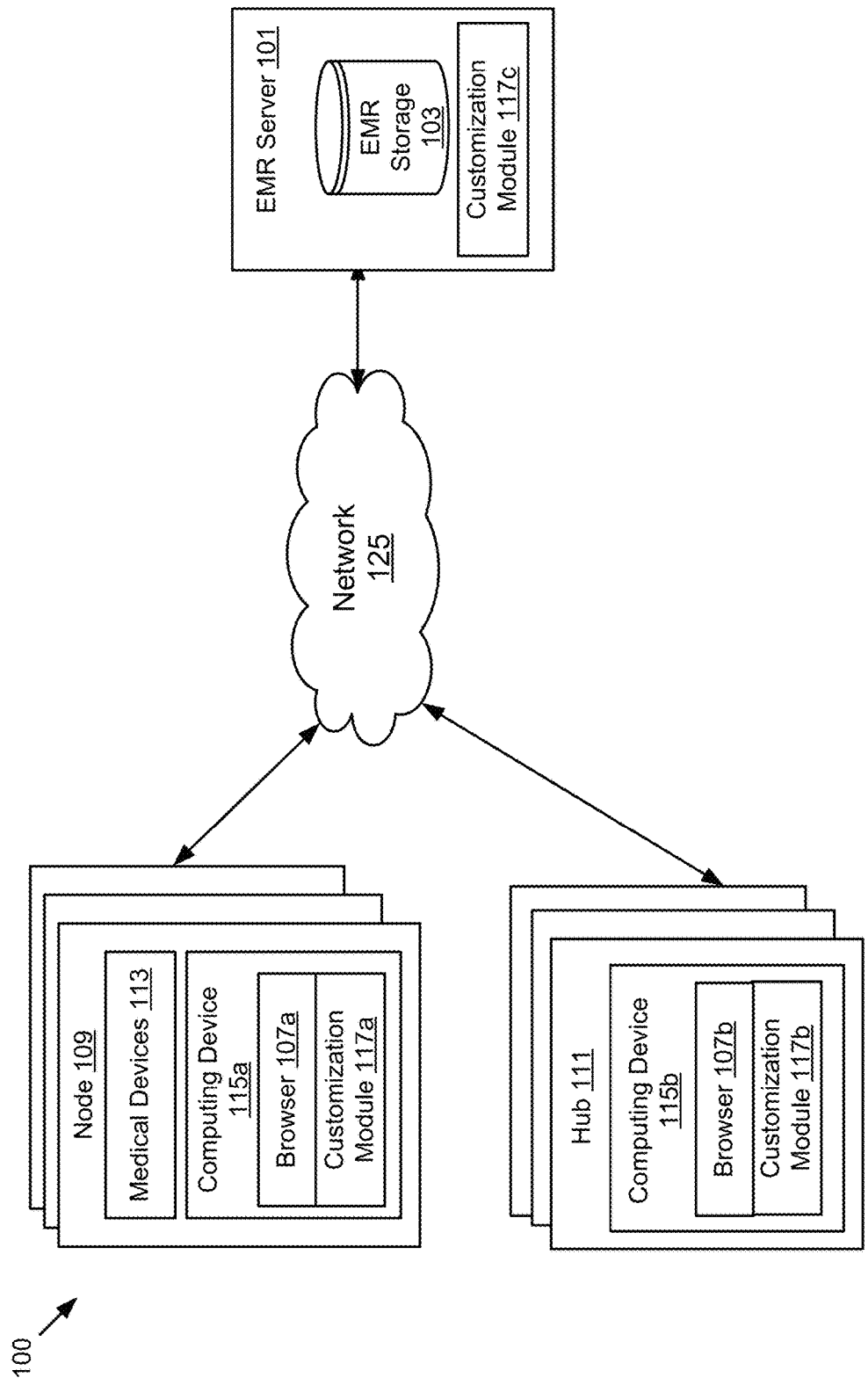
FIG. 1 depicts a high-level block diagram illustrating one embodiment of a system for allocating a workflow for an application between a server and a client and customizing user views based on the execution of the workflow.

FIG. 1 depicts a high-level block diagram illustrating one embodiment of a system 100 for allocating a workflow for an application between a server and a client, based on user context determined by usage of the application, and customizing user views based on the execution of the workflow. The illustrated system 100 depicts a cloud based telemedicine system. The illustrated system 100 includes one or more nodes 109, an electronic medical record (EMR) server 101, and one or more hubs 111. In the illustrated embodiment, these entities of the system 100 are communicatively coupled via a network 125.

Although FIG. 1 and the corresponding text describe a cloud based telemedicine system 100, it is to be understood that in other embodiments the components illustrated and the techniques described herein may be applied to other cloud-based systems such as distance education.

The network 125 can be a conventional type, wired or wireless, and may have numerous different configurations including a star configuration, token ring configuration or other configurations. Furthermore, the network 125 may include a local area network (LAN), a wide area network (WAN) (e.g., the Internet), and/or other interconnected data paths across which multiple devices may communicate. In some embodiments, the network 125 may be a peer-to-peer network. The network 125 may also be coupled to or include portions of a telecommunications network for sending data in a variety of different communication protocols. In some embodiments, the network 125 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 125 coupled to the nodes 109, the EMR server 101, and the hubs 111, in practice one or more networks 125 can be connected to these entities.

A node 109 is a place where a patient interacts with the system 100, for example, registers with the system, schedules an appoint, receives a medical consultation, etc. In some embodiments, the node 109 is located remotely from a hub 111. For example, the node 109 may be a facility physically located in a rural area while a hub 111 may be physically located in a city. In another example, the node 109 may be a patient's home and the hub 111 may be a nearby or distant hospital. In other embodiments, the node 109 may be mobile, for example, a vehicle.

The node 109 is staffed by personnel (e.g., medical assistants) that are trained to assist a patient during a medical visit. In some embodiments, the node 109 includes a computing device 115a and medical devices 113. The medical assistants (e.g., a registered nurse, a lab technician) at the node 109 operate the computing device 115a and medical devices 113. For example, a medical assistant is trained to use the medical devices 113 to obtain the patient's medical information and to use the computing device 115a to register the patient for medical consultation and or communicate with the hub or hub personnel.

In some embodiments, the computing device 115a can be a laptop computer, a desktop computer, a tablet computer, a mobile telephone, a personal digital assistant (PDA), a mobile email device, a television with one or more processors embedded therein or coupled thereto or any other electronic device capable of accessing the network 125. The node personnel uses the computing device 115a to access data of a patient stored on EMR storage of the EMR server 101, to obtain medical consultation for a patient from a medical service provider at the hub 111, etc. In FIG. 1 and the remaining figures, a letter after a reference number, e.g., "115a," represents a reference to the element having that particular reference number. A reference number in the text without a following letter, e.g., "115," represents a general reference to instances of the element bearing that reference number.

In some embodiments, the medical devices 113 but are not limited to, a stethoscope, a blood pressure meter, a pulse oximeter, a thermometer, an ophthalmoscope, a weight and height scale, an otoscope, a camera, a telecardiology device (e.g. an ECG machine), a telepathology device (e.g. a microscope), a teledermatology device (e.g. a high-resolution camera), a teleradiology device (e.g. an ultrasound machine), etc. The medical device 113 works with the computing device 115a to allow node personnel to communicate with other entities of the system 100. For example, the computing device 115a captures a patient measurement from the medical device 113, and sends the measurement to the healthcare provider at the hub 111 for processing or to the EMR server for storage, which beneficially reduces errors from node personnel misreading the medical device 113 and transcription errors from node personnel miss-recording the measurement of the medical device 113.

A hub 111 is a place where a healthcare provider (e.g., a doctor) interacts with the system 100. In one embodiment, a hub 111 may be a centralized physical facility that connects with the nodes 109 and allows a healthcare provider to remotely consult with and diagnose the patient at the node 109 on an as needed basis using a computing device 115b.

The hub 111 includes at least one computing device 115b, which is used by the healthcare provider to communicate with the EMR server 101 and the node 109. The computing device 115b is similar to the computing device 115a described above and the description will not be repeated here. A healthcare provider at the hub 111 uses the computing device 115b to log into the system, search for patients, schedule patients, order prescriptions, make notes, perform video conferencing, generate reports, perform analytics, etc. By allowing remote consultation of a patient at a node 109 by a healthcare provider at a hub 111 in the telemedicine system 100, the healthcare provider is effectively used and patients may receive high quality medical care.

In some embodiments, the node 109 and the hub 111 are referred to herein as clients in the cloud based telemedicine system 100. The clients communicate with the cloud server (s) on the server side of the cloud based telemedicine system 100 to implement various functions (e.g., register a patient, check-in a patient, schedule a patient, order prescriptions). In the illustrated embodiment, the server side includes an EMR server 101.

In some embodiments, the EMR server 101 may be either a hardware server, a software server, or a combination of software and hardware. The EMR server 101 may be, or may be implemented by, a computing device including a processor, a memory, applications, a database, and network communication capabilities. Responsive to a client (e.g., a node 109, a hub 111) determining the allocation of a workflow for an application between the client and the server, the EMR server 101 executes the server portion of the workflow on the server side and cooperates with the client to customize and display one or more user views for a user at the client.

In some embodiments, the EMR server 101 includes EMR storage 103 and a customization module 117c. In some embodiments, the EMR storage 103 is a database that includes electronic medical records for patients of the telemedicine system 100. Each time the node 109 or hub 111 transmits information about a patient, the EMR server 101 updates the electronic medical record of the patient on EMR storage 103.

The customization module 117 may include software and/or logic for identifying a workflow and core capabilities for performing the workflow. The customization module 117c of the EMR server 101 can transmit the core capabilities to a client for performing the workflow for the application. The core capabilities may include foundation layer components, domain layer components, and view layer components as discussed in more detail elsewhere herein. In some embodiments, the customization module 117 may allocate a workflow for an application between a server and a client and customizing user views based on the execution of the workflow, among other things. In some embodiments, the customization module 117 can be implemented using programmable or specialized hardware. In some embodiments, the customization module 117 can be implemented using a combination of hardware and software. In other embodiments, the customization module 117 may be stored and executed on a combination of the client (e.g., the node 109 or the hub 111) and the EMR server 101.

In some embodiments, a client includes a browser 107 and a customization module 117 for determining a workflow for an application, allocating the workflow for the application between the client and the server, and customizing one or more user interfaces based on the execution of the workflow. For example, in the illustrated embodiment, the computing device 115a on the node 109 includes a browser 107a and a customization module 117a, and the computing device 115b on the hub 111 includes a browser 107b and a customization module 117b.

In some embodiments, the browser 107 is used by a user accessing the client (e.g., the node 109 or the hub 111) to view and transmit information. For example, a user sends a login request using the browser 107 to request access to data stored on the EMR server 101. If the user needs to be authenticated, the EMR server 101 may communicate with the user via the browser 107 to obtain information related to authenticating the user. Depending on whether the authentication is successful, the browser 107 then displays, for the user, the content the user requests or an error message indicating denial of access to the requested content.

In some embodiments, the customization module 117 residing on the client receives user input via the browser 107 and identifies an application to run based on the user input. For example, the customization module 117 determines to run a registration application based on receiving a request for registering a patient on the node 109. The customization module 117 then determines a workflow for the application. For example, the customization module 117 may determine that the workflow for the registration application includes receiving user information, verifying the user information, and generating user interfaces to indicate the registration result. The workflows for a registration application may be different depending on different roles associated with different users, or different user context determined by usage of the application. The customization module 117 partitions the workflow to a first portion of workflow executed on a client and a second portion of workflow executed on a server. For example, the customization module 117 determines that only the server can verify the user information while the client can execute the rest steps of workflow, i.e., receiving the user information and generating the user interfaces. The customization module 117 generates one or more user interfaces corresponding to the execution of the first portion of workflow. For example, if the registration succeeded, the customization module 117 generates a user interface including a welcome message. Otherwise, the customization module 117 generates a user interface with an error message indicating the failure of the registration. The user interface displayed to users may be different depending on user context for specific users. For example, every user interface indicating a successful registration may include an individual's name. However, based on the user context, only a first user interface indicates how long the registration application took for a first user, a second user interface indicates what the registered user can do, and so on. The operation of the customization module 117 and the functions listed above are described below in more detail with reference to FIGS. 3-7B.

In some embodiments, the customization module 117 is built on a multilayer architecture of the client. For example, the client has a foundation layer, a domain layer and a view layer. Each layer is configured to support partial implementation of the functionalities of the customization module 117. In some embodiments, the foundation layer of the client serves as a primary gateway to various applications or services. For example, the customization module 117 on the node 109 identifies an application as scheduling an appointment, and communicates with the EMR server 101 to handle this application through a scheduler-service-gateway available in the foundation layer of the client. In some embodiments, the domain layer of the client acts as a solution specific gateway. For example, the customization module 117 determines that a registration workflow and a consultation workflow are needed for a new consultation application based on the domain layer. In some embodiments, the customization module 117 determines the user interface components that are displayed on the client based on the view layer of the client.

The techniques described herein advantageously leverage the multilayer architecture described herein and the growing computational power of computing devices to offload domain-critical computational complexity from the cloud server to the client, and therefore avoid degradation of the performance due to overloaded computation on the cloud server. In addition, by creating workflows that differentiate user context and user roles and controlling the data given to the user for view, the techniques described herein customize user views for each user and therefore enhance an end-user's experience.

Figure 2:
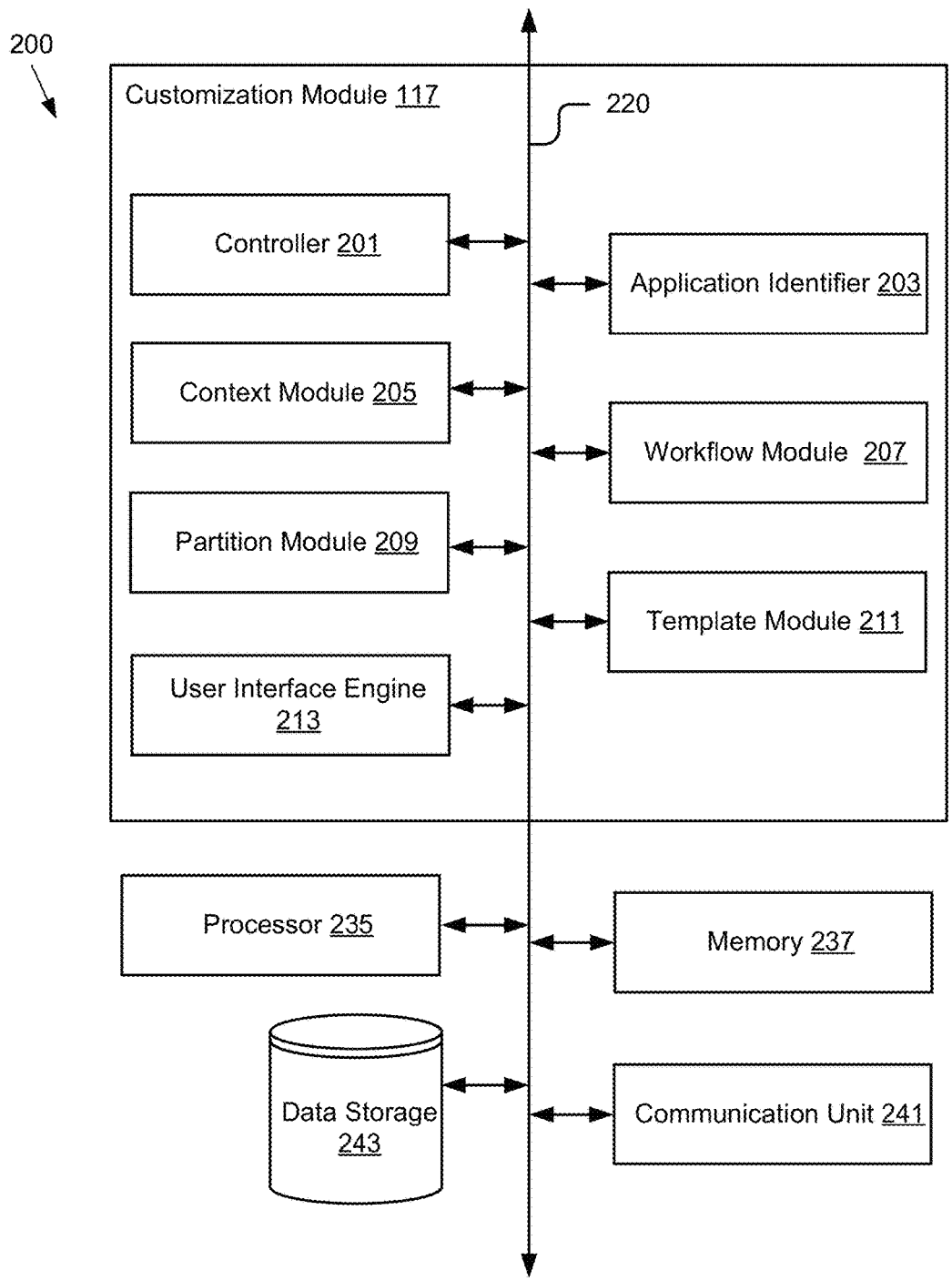
FIG. 2 depicts a block diagram illustrating one embodiment of a computing device including a customization module.

FIG. 2 is a block diagram illustrating one embodiment of a computing device 200 including a customization module 117. The computing device 200 may also include a processor 235, a memory 237, a communication unit 241, and data storage 243 according to some examples. The components of the system 200 are communicatively coupled to a bus or software communication mechanism 220 for communication with each other. In some embodiments, the computing device 200 may be a node 109, a hub 111, or a combination of the node 109 and the hub 111.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of user interfaces corresponding to the execution of a workflow of an application, and performing complex tasks including context identification, workflow partition, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the customization module 117, and the data storage 243. It will be apparent to one skilled in the art that other processors, operating systems, and physical configurations are possible.

The memory 237 may store and provide access to data for the other components of the computing device 200. In some implementations, the memory 237 may store instructions and/or data that may be executed by the processor 235. The instructions and/or data may include code for performing the techniques described herein. For example, in one embodiment, the memory 237 may store the customization module 117. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The communication unit 241 is hardware for receiving and transmitting data by linking the processor 235 to the network 125 and other processing systems. The communication unit 241 receives data such as requests for applications from the client (e.g., the node 109, the hub 111) and transmits the requests to the controller 201. The communication unit 241 also receives information related to an application for the client to display, for example, a scheduled time in response to an appointment scheduling application. The communication unit 241 is coupled to the bus 220. In one embodiment, the communication unit 241 may include a port for direct physical connection. In another embodiment, the communication unit 241 may include a wireless transceiver (not shown) for exchanging data with the client device 115 or any other communication channel using one or more wireless communication methods, such as IEEE 802.11, IEEE 802.16, Bluetooth®, cellular communications, or another suitable wireless communication method.

The data storage 243 is a non-transitory memory that stores data for providing the functionality described herein. For example, the data storage 243 may store various type of applications, user context in usage of an application, a workflow for an application, a template for an application including a partition of a workflow for the application, etc. The data stored in the data storage 243 is described below in more detail. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the customization module 117 may include a controller 201, an application identifier 203, a context module 205, a workflow module 207, a partition module 209, a template module 211, and a user interface engine 213. The components of the customization module 117 are communicatively coupled via the bus 220. The components of the customization module 117 may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 235. In some embodiments, the components are instructions executable by the processor 235. In some implementations, the components are stored in the memory 237 and are accessible and executable by the processor 235.

The controller 201 may include software and/or logic to control the operation of the other components of the customization module 117. The controller 201 controls the other components of the customization module 117 to perform the methods described below with reference to FIGS. 3-7B. In other implementations, the processor 235, the memory 237 and other components of the customization module 117 can cooperate and communicate without the controller 201.

In some embodiments, the controller 201 sends and receives data, via the communication unit 241, to and from one or more of the node 109, the hub 111 and the EMR server 101. For example, the controller 201 receives data for providing a graphical user interface to a user from the EMR server 101, and causes the user interface engine 213 on the node 109 to present the user interface to the user on the computing device 115a using the browser 107a.

In some embodiments, the controller 201 receives data from other components of the customization module 117 and stores the data in the data storage 243. For example, the controller 201 may receive a workflow for an application from the workflow module 207 and store the workflow in the data storage 243. In other embodiments, the controller 201 retrieves data from the data storage 243 and sends the data to other components of the customization module 117. For example, the controller 201 may receive a template for an application from the data storage 243, and transmit the template to the partition module 209 for performing a workflow of an application based on the partition of the workflow included in the template.

The application identifier 203 may include software and/or logic to provide the functionality for receiving user input to identify a type of an application. In some embodiments, the application identifier 203 receives user input via a user interface displayed by the browser 107 on the computing device 115 of the client. The client can be the node 109 or the hub 111. For example, the application identifier 203 determines that a user wants to pay a bill based on a URL entered by the user through a browser 107a of the computing device 115a on the node 109. In another example, the application identifier 203 receives a selection on a web page displayed on the computing device 115b of the hub 111, and identifies that the application is to register check a patient in. In other embodiments, the application identifier 203 captures output of a medical device, and uses it as user input for identifying a type of an application. For example, the application identifier 203 determines that a video conference camera is on, and identifies the application as performing video conferencing. Or the application identifier 203 identifies an application of generating a report based on an X-ray being taken by an X-ray machine. Various types of applications include, but are not limited to, registering users, authenticating users, searching for patients, scheduling patients, checking patients in, paying a bill, processing insurance information, ordering prescriptions, processing lab results, making notes, performing video conferencing, generating reports, etc.

Figure 3:
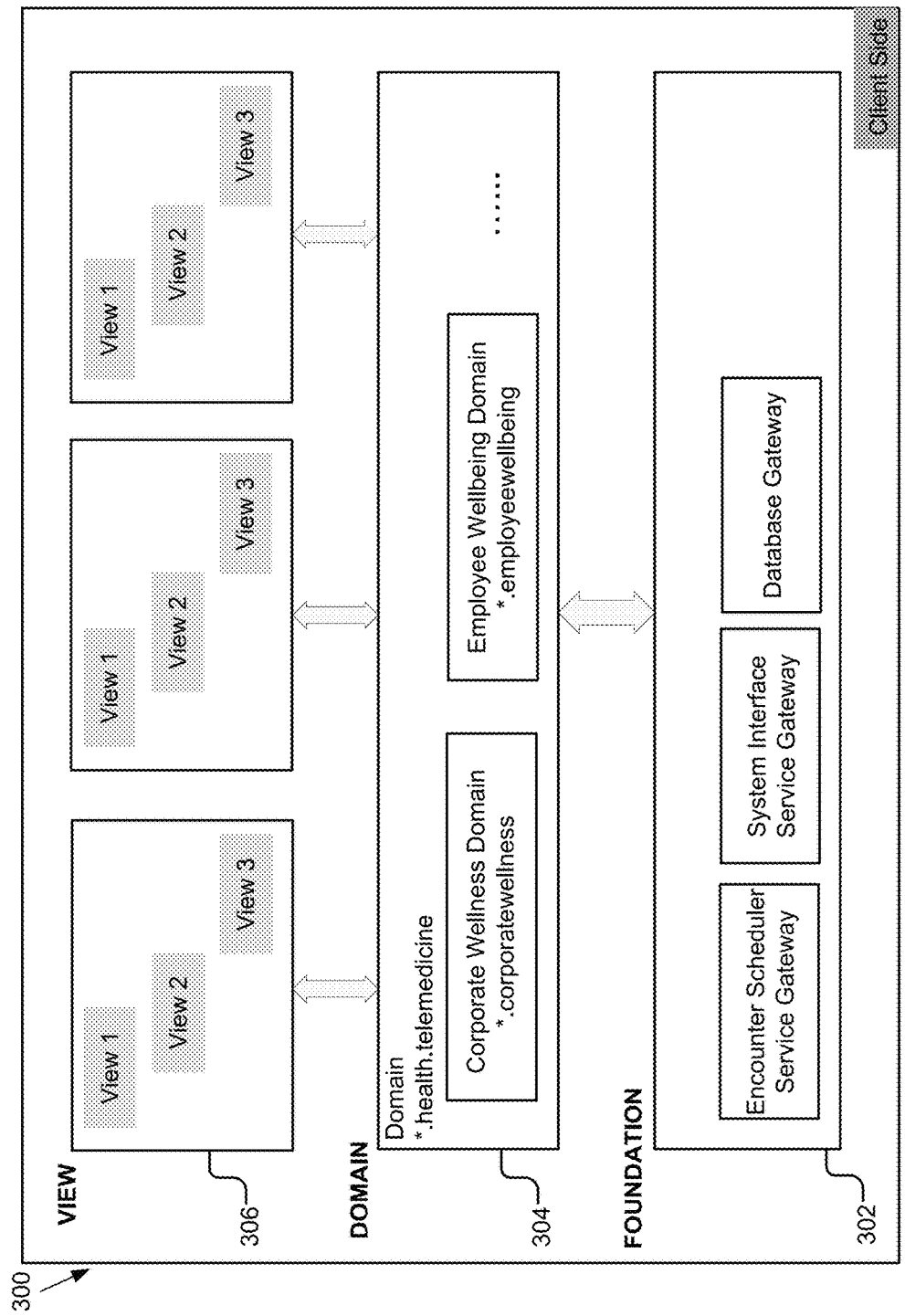
FIG. 3 depicts a block diagram illustrating one embodiment of a client side architecture view.

In some embodiments, the client, e.g., the node 109 or the hub 111, in the cloud based proprietary-telemedicine system 100 contains a multi-layer architecture. FIG. 3 depicts one embodiment of a client side architecture 300. The architecture 300 of a client includes a foundation layer 302, a domain layer 304, and a view layer 306. In some embodiments, the foundation layer 302 of the client serves as a primary gateway to various applications or services. For example, as shown in FIG. 3, the foundation layer 302 includes an encounter scheduler service gateway, a system interface service gateway, a database gateway, etc. Once an application is identified, the application identifier 203 determines a gateway from the foundation layer 302 based on the application such that the client can establish communication with other entities of the system 100 through the determined gateway when executing a workflow for the application. For example, responsive to identifying an application to schedule an encounter between a patient and a healthcare provider, the application identifier 203 identifies the schedule service gateway for communicating with the EMR server, for example, receiving a calendar of the healthcare provider. Based on the calendar, an appropriate time can be scheduled for the encounter. The layers 302-306 of the multi-layer architecture is described in more detail below.

The context module 205 may include software and/or logic to provide the functionality for determining user context determined by usage of an application. In some embodiments, the context module 205 receives user input and an application identified by the application identifier 203 based on the user input, and determines user context for the application based on the user input.

In some embodiments, the context module 205 determines a type of user device used to enter the user input. For example, the context module 205 may receive a media access control (MAC) address that was used to send the user input, and determine whether the user input was entered on a mobile phone or a desktop computer from a lookup of the MAC address. Similarly, the context module 205 may determine that a mobile phone was used to enter an application request form because the request in that form is specific for mobile phones.

In some embodiments, the context module 205 determines location information of a user that initiated the application with user input based on identifying the origin of the user input. For example, the context module 205 may receive an internet protocol (IP) address associated with the user input and determines a location from which the user input was sent. Other techniques such as global positioning system (GPS), signal triangulation, and the like, can also be used to determine an origin of the user input.

Referring now to FIG. 3, the client side architecture 300 includes a domain layer 304. The domain layer 304 includes the domains used in the telemedicine environment (also referred to herein as "internal domains"). For example, in FIG. 3, the internal domains include a corporate wellness domain and an employee wellbeing domain. In some embodiments, the context module 205 identifies from which domain the user input originated, and determines whether the user input was from an internal domain based on a comparison with the domain information included in the domain layer 304. Determining whether the user input is from an internal domain helps determine a user role and determine a workflow for the application identified from the user input.

In some embodiments, the context module 205 determines bandwidth information associated with the application. For example, the context module 205 may determine limited bandwidth for the application since a mobile phone is used in the application. Or the context module 205 may have an estimation of network bandwidth if communication by the application is within internal domains.

In some embodiments, the context module 205 identifies a user role for a user that initiated the application with the user input. The user role identifies whether a user is a patient, a medical assistant, a healthcare provider, an insurance provider, etc. The user role may also include a level. For example, the context module 205 may determine a junior nurse role, a senior nurse role, and a chief nurse role. The user role associated with a level reflects which data on the client and/or the server a user may access. In some embodiments, the context module 205 determines a user role based on information specified in the user input. For example, the context module 205 determines that a user is a patient because the user selected "patient" role in the user input. In another example, the context module 205 identifies a nurse role because an identification number in the user input belongs to a registered nurse. In other embodiments, the context module 205 determines a user role based on information derived from the user input. For example, the context module 205 determines that a patient initiated a check-in application because the application request was sent from an IP address of a medical kiosk.

The context module 205 also determines other user context. For example, the context module 205 identifies user preferences from the user input such as whether the user preferences include video or audio communication, whether the user prefers text or graphic messages, etc. These preferences not only affect what kind of data is presented to the user but also contribute to the determination of the workflow and the partition of the workflow. One skilled in the art will recognize other user context may be determined by the context module 205.

In some embodiments, the context module 205 transmits the user context for an application to the workflow module 207. In other embodiments, the context module 205 also stores the user context in the data storage 243.

The workflow module 207 may include software and/or logic to provide the functionality for determining a workflow for an application. In some embodiments, the workflow module 207 receives the type of the application from the application identifier 203, receives the user role and user context from the context module 205, and determines the workflow for the application based on the type of the application, the use role and the user context.

In some embodiments, the workflow module 207 determines a workflow for an application based on the type of the application. For example, the workflow module 207 determines that workflow steps for a scheduling application are different from the workflow steps for an authentication application.

In some embodiments, the workflow module 207 determines a workflow for an application based on the user role. For example, the application identifier 203 identifies an application of scheduling an encounter between a patient and a healthcare provider. If the context module 205 determines that a user with a medical assistant role initiated the application, the workflow module 207 determines a scheduling workflow and corresponding workflow steps. However, if the context module 205 determines that a user with a patient role initiated the application, the workflow module 207 determines that the patient needs to be registered before scheduling an appointment. As a result, the workflow module 207 determines a registration workflow and a scheduling workflow for this application. In another example, for an application of taking clinical-notes, the workflow module 207 may change the complexity of the workflow based on the user role being a chief nurse role or a junior nurse role.

In some embodiments, the workflow module 207 determines a workflow for an application based on the user context. The user context includes a type of a user device, location information, network bandwidth, user preferences, and other information related to the application. In some embodiments, for an application initiated by users at a first location and a second location respectively, the workflow module 207 may determine different workflows for the users based on differences of geographically applicable guidelines mandated for telemedicine solutions. For example, for a scheduling application with a specialist, the workflow module 207 determines that the workflow for a user in a first location may include getting a referral from a generalist before scheduling with the specialist, while the workflow module 207 may skip this step of getting a referral from a generalist for a user in a second location based on a different guideline in the second location. In some embodiments, the workflow module 207 may determine different workflows for an application depending on whether the application was initiated from an internal domain or from an outside domain. For example, if a nurse takes notes from a computer of an internal domain, the workflow module 207 determines that the authentication of the nurse may be optional. However, if the nurse takes notes from the outside domain, the workflow module 207 determines that the authentication of the nurse is required in the workflow. In some embodiments, the workflow module 207 determines a workflow for an application based on network bandwidth. The workflow module 207 may remove one or more steps from a workflow of an application in the case of poor bandwidth, or may change the order of workflow steps to postpone some steps to be executed when the network traffic improves (e.g., at nights when a few people use the network). In some embodiments, the workflow module 207 also takes into account user preferences when determining a workflow for an application. For example, for an application of receiving medical consultation, the workflow module 207 may not initiate a video conference as a workflow step based on the preference of a patient.

The workflow module 207 may update the workflow of an application to adapt to a change related to the application. For example, the workflow module 207 may edit, add, or remove a workflow step based on a change of laws or regulations of a particular region or government. In another example, the workflow module 207 may simplify the workflow based on new functionality added to the client. In some embodiments, the workflow module 207 may also communicate with the partition module 209 to update the workflow of an application based on the information received during the execution of the workflow. For example, the workflow module 207 may launch a variant of a workflow based on the frequency of failures occurred in the execution of the previous workflow determined by the partition module 209. In some embodiments, the workflow module 207 may transmit the workflow for an application to the partition module 209 and the template module 211. In other embodiments, the workflow module 207 may also transmit the workflow for an application to the data storage 243.

The partition module 209 may include software and/or logic to provide the functionality for receiving the workflow of an application from the workflow module 207, and partitioning the workflow to a first portion of the workflow executed on the client and a second portion of the workflow executed on a server. Distributing functionality in different servers and clients is helpful in load balancing. In one embodiment, the cloud server (e.g., EMR server 101) becomes a light-weight system with fewer tasks to perform for each application and can handle more sessions, while the client performs more tasks.

In some embodiments, the partition module 209 determines a partition of the workflow based on the type of an application. For example, the partition module 209 determines to move workflow steps related to an application of generating user interfaces from the EMR server 101 to the client.

In some embodiments, the partition module 209 determines a partition of the workflow based on the user role. In some embodiments, the partition module 209 determines a partition of the workflow based on the user context. For example, the partition module 209 allocates a majority of the workflow to be executed on the client side if the computing device 115 on the client side is capable of handling the workload. In another example, the partition module 209 may leave the portion of the workflow that is determined based on geographical differences to be executed on a client in that specific geographical location.

The customization module 117 is built on a multi-layer architecture of the client, for example, the architecture including the foundation layer 302, the domain layer 304 and the view layer 306 as depicted in FIG. 3. These layers provide core capabilities to build meaningful and effective solutions in telemedicine. In some embodiments, the partition module 209 determines which data can be displayed to a user in a specific user context and which data can be displayed to all users based on the domain layer 304. For example, the partition module 209 may determine medical assistants from a first set of departments can access data in a first domain, medical assistants from a second set of departments can access a first portion of data in a second domain, etc.

Since the data flows through gateways of the foundation layer 302, the foundation layer 302 has an inherent audit functionality, i.e., the foundation layer 302 can handle audits and audit trails by capturing every atomic transaction and status of transaction as part of an auditable event. As a result, the partition module 209 can trace the chain of the workflow of an application and every transaction in the execution of the workflow of the application through the foundation layer 302. For example, the partition module 209 can detect a failure occurred in the execution of the workflow, and respond to the failure by recovering or rolling-back the execution of the workflow. In some embodiments, the partition module 209 notifies the user interface engine 211 of the failure, the recovery, and the rollback to instruct the user interface engine 211 to generate or modify the user interfaces for display to the user of the client. In some embodiments, the partition module 209 may also notify the workflow module 207 to update the workflow of an application based on the failure, the recovery and the rollback. For example, the partition module 209 determines that the number of recoveries based on a failure exceeds a threshold number, and notifies the workflow module 207 to change the workflow. In such a case, the partition module 209 may also update the partition of the workflow base on the change of the workflow.

The template module 211 may include software and/or logic to provide the functionality for creating and retrieving templates for applications. In some embodiments, the template module 211 determines whether there is a template for an application based on searching templates stored on the data storage 243. In some embodiments, the template module 211 accesses the stored templates using a database gateway of the foundation layer 302 as shown in FIG. 3, and identifies, from the stored templates, whether there is a template for the application. Responsive to determining that a template for the application exists, the template module 211 transmits the template to the partition module 209 for executing the workflow of the application based on a partition of the workflow included in the template. Responsive to determining that a template for the application does not exist, the template module 211 communicates with the partition module 209 to create a template for the application. The template includes the partition of the workflow that is determined for the application based on the type of the application, the user role, and the user context. In some embodiments, the template module 211 stores the template on the data storage 243. In some embodiments, the template module 211 also updates the template based on the updated partition received from the partition module 209. Creating a template for an application enables various capabilities to be pre-configured as a compile time as well as runtime activity. This allows quick deployment of application and solution provisioning for various customers.

The user interface engine 213 may include software and/or logic for providing user interfaces to a user. In some embodiments, the user interface engine 213 generates user interfaces at the view layer 306 as depicted in FIG. 3. In some embodiments, the user interface engine 213 generates a user interface to receive user input such that the application identifier 203 can identify a type of an application from the user input. For example, the user interface engine 213 may display an application request form in a graphical user interface for a user to fill out, or receive a selection of a portion of the user interface to initiate an application.

In some embodiments, the user interface engine 213 receives instructions from the partition module 209, and sends graphical user interface data to a browser 107 in the client (e.g., a node 109 or a hub 111) via the communication unit 241 causing the browser 107 to display the data in a user interface. The user interface engine 213 generates customized user views for a user that correspond to the execution of the workflow of an application. For example, the user interface engine 213 may generate three different user interfaces for three users responsive to the execution of the workflow of the first portion of an application. Depending on the user role and user context of the three users, a first user may see the payment information and the insurance information from his/her view, a second user may see the insurance information only from his/her view, while a third user may not see either the insurance information or the payment information from his/her view.

In some embodiments, the user interface engine 213 may also generate or update the user interfaces displayed to a user responsive to at least one of a failure, a recovery, and a rollback detected by the partition module 209 in executing the first portion of the workflow for an application on the client. The user interface for a user is also customized based on the type of the application, the user role and the user context of the user. For example, the user interface engine 213 may generate a user interface to notify a user about a failure of the execution of a workflow. However, the user interface engine 213 may include the reason for the failure in a user interface for one user but not in the user interface for another user.

Referring again to the example client side architecture 300 in FIG. 3, a scheduling application that is implemented based on this architecture is described. Communication between entities of the system 100 in allocating the workflow for the application and providing customized user views corresponding to the execution of the workflow flow through an encounter scheduler server gateway from the foundation layer 302 based on the type of the application. Other gateways of the foundation layer 302 and other layers may also be used. For example, the context module 205 may determine user context (e.g., a type of user device) based on communication using a system interface server gateway of the foundation layer 302. The template module 211 may determine whether a template exists for the application based on communication using a database gateway of the foundation layer 302. The workflow module 207 may determine step-by-step workflow based on the domain layer 304 (e.g., the domain layer 304 relates to access of medical record and a workflow for a medical consultation application is based on the access of medical records). The partition module 209 may determine which data should be displayed to a user based on the domain layer 304. The user interface engine 213 may provide customized user interfaces to a user at the view layer 306. The multi-layer architecture in FIG. 3 is also beneficial for aggregating various applications seamlessly via various interfaces, integrating a wide array of medical devices, etc.

Figure 4:
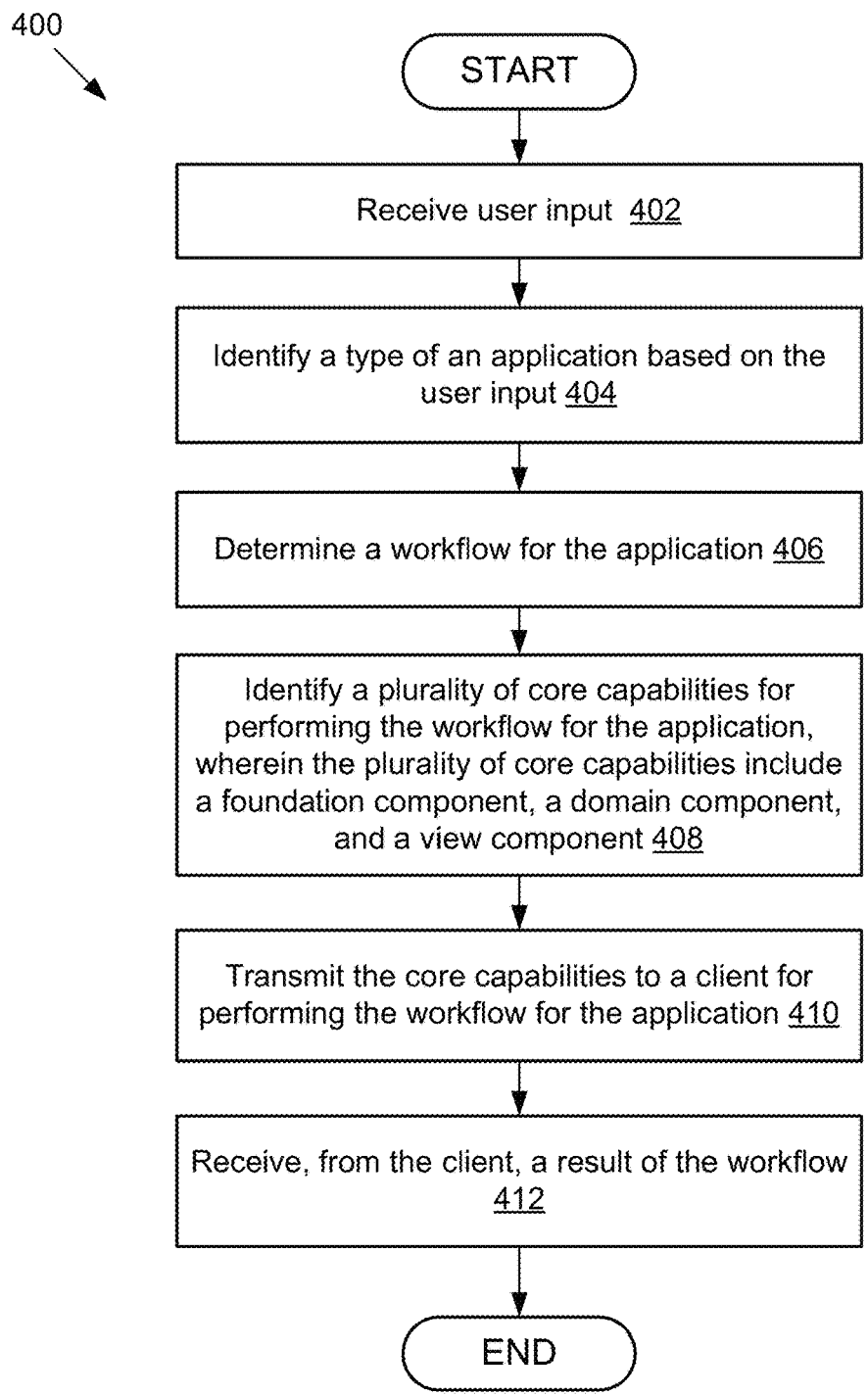
FIG. 4 depicts a flow diagram illustrating one embodiment of a method for allocating a workflow for an application between a server and a client, based on user context determined by usage of the application, and customizing user views based on the execution of the workflow.

FIG. 4 is a flow diagram 400 illustrating one embodiment of a method for allocating a workflow for an application between a server and a client based on user context in usage of the application, and customizing user views based on the execution of the workflow. As described above, the customization module 117 may include an application identifier 203, a workflow module 207, a partition module 209, and a user interface engine 213. The application identifier 203 receives 402 user input and identifies 404 a type of an application based on the user input. At 406, the workflow module 207 determines a workflow for the application. At 408, the workflow module 207 identifies a plurality of core capabilities for performing the workflow for the application, wherein the plurality of core capabilities include a foundation component, a domain component, and a view component. At 410, the workflow module 207 transmits the core capabilities to a client for performing the workflow for the application. At 412, the workflow module 207 receives, from the client, a result of the workflow.

The example of FIG. 4 describes a workflow that is performed by a client (e.g., node 109) based on core capabilities transmitted from a customization module 117 of a server (e.g., customization module 117c of EMR server 101). However, it should be understood that, as described elsewhere herein, the performance of the workflow may be partitioned between the client and the server with core capabilities for performing the workflow similarly partitioned between the client and the server. It should be apparent that the core capabilities can be partitioned in many variations which are contemplated by this disclosure.

Figure 5A:
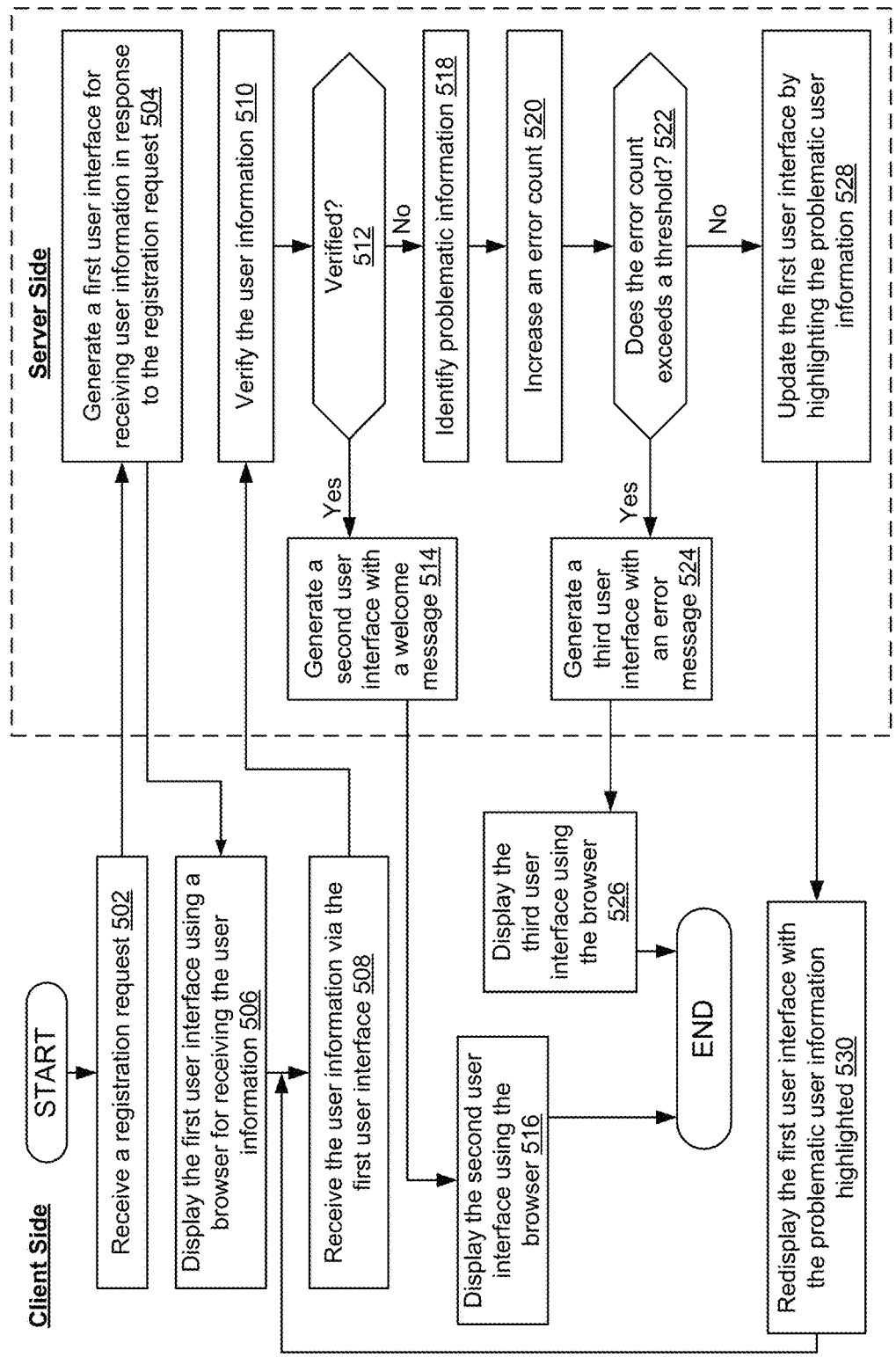
FIG. 5A depicts a flow diagram illustrating one embodiment of a method for registering a user.

FIG. 5A is a flow diagram 500 illustrating one embodiment of a method for registering a user. The registration procedure starts from receiving a registration request at the client side. The client may include a node 109 or a hub 111. At 502, the client receives a registration request. The client sends the registration request to the server side. The server may include an EMR server 101. At 504, the server generates a first user interface for receiving user information in response to the registration request. The server sends the first user interface to the client. At 506, the client displays the first user interface using a browser for receiving the user information. At 508, the client receives the user information via the first user interface. The client then sends the user information to the server. At 510, the server verifies the user formation. At 512, the server determines whether the user information is verified. Responsive to the user information being verified, the server generates 514 a second user interface with a welcome message. The server sends the second user interface to the client. At 516, the client displays the second user interface using the browser. Responsive to the user information failing to be verified, the server identifies 518 problematic information. At 520, the server increases an error count. For example, the original error count is zero. When the problematic information is identified once, the error count is increased to one. When the problematic information is identified twice, the error count is increased to two, and so on. At 522, the server determines whether the error count exceeds a threshold. If the error count does not exceed the threshold, the server updates 528 the first user interface by highlighting the problematic user information. The server sends the updated first user interface to the client. At 530, the client redisplays the first user interface with the problematic user information highlighted. The method 500 returns to step 508, where the new user information is received via the updated first user interface to replace the problematic information. If the error count exceeds the threshold, the server generates 524 a third user interface with an error message to indicate that the registration fails and sends the third user interface to the client. At 526, the client displays the third user interface using the browser.

Figure 5B:
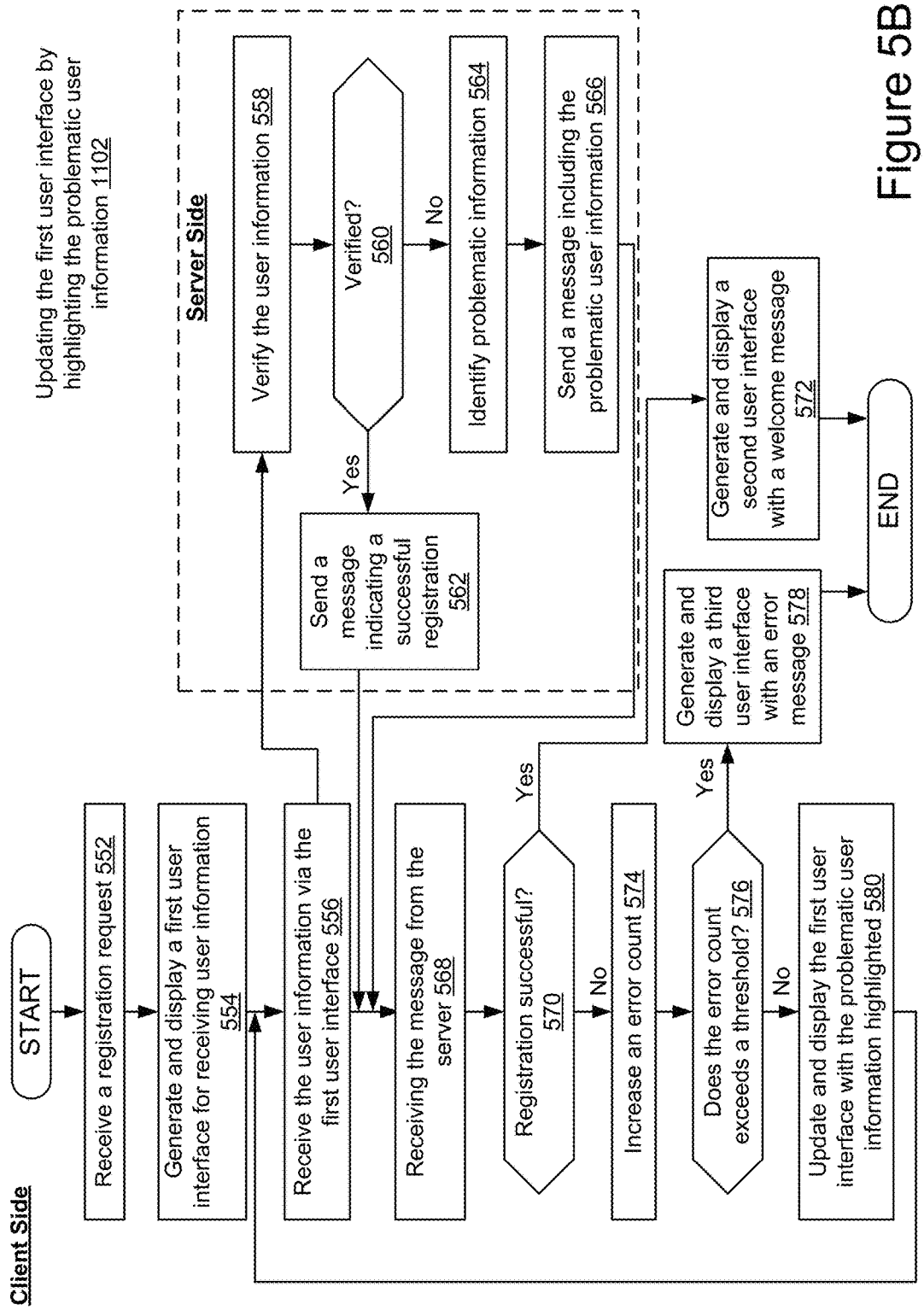
FIG. 5B depicts a flow diagram illustrating one embodiment of a method for allocating a workflow for registering a user between a server and a client.

FIG. 5B is a flow diagram 550 illustrating one embodiment of a method for allocating a workflow for registering a user between a server and a client. The server may be EMR server 101. The client may be a node 109 or a hub 111. The registration procedure is similar to FIG. 5A with fewer tasks being implemented at the server side and more tasks being implemented on the client side. At 552, the client receives a registration request. At 554, the client generates a first user interface for receiving user information. At 556, the client receives the user information via the first user interface. The client sends the user information to the server. At 558, the server verifies the user formation. At 560, the server determines whether the user information is verified. Responsive to the user information being verified, the server sends 562 a message indicating a successful registration to the client. Responsive to the user information failing to be verified, the server identifies 564 problematic information and sends 566 a message including the problematic user information to the client.

At 568, the client receives the message from the server. At 570, the client determines whether the registration is successful based on the message. If the registration is successful, at 572, the client generates and displays a second user interface with a welcome message. If the registration fails, the client increases 574 an error count. At 576, the client determines whether the error count exceeds a threshold. If the error count does not exceed the threshold, at 580, the client updates and displays the first user interface with the problematic user information highlighted. The method 550 goes back to step 556, where the user information is renewed via the updated first user interface. If the error count exceeds the threshold, the client generates 578 a third user interface with an error message to show that the registration fails.

A comparison shows that, in FIG. 5B, many steps are moved to the client to leverage the multilayer architecture of the client and the computational power of the client to reduce computing resource consumption at the server and network transmissions from the client to the server. For example, the server generates all user interfaces and sends the user interfaces to the client for display in FIG. 5A, while the client takes over the generation of the user interfaces in FIG. 5B. Although, the Example of FIG. 5 depicts a particular partitioning of workflow steps, it should be recognized that other variations are possible and are within the scope of this disclosure. For example, as described above with reference to FIG. 4, all of the workflow may be performed by a client device, with the server simply identifying and transmitting the core capabilities for performing the workflow to the client.

Figure 6A:
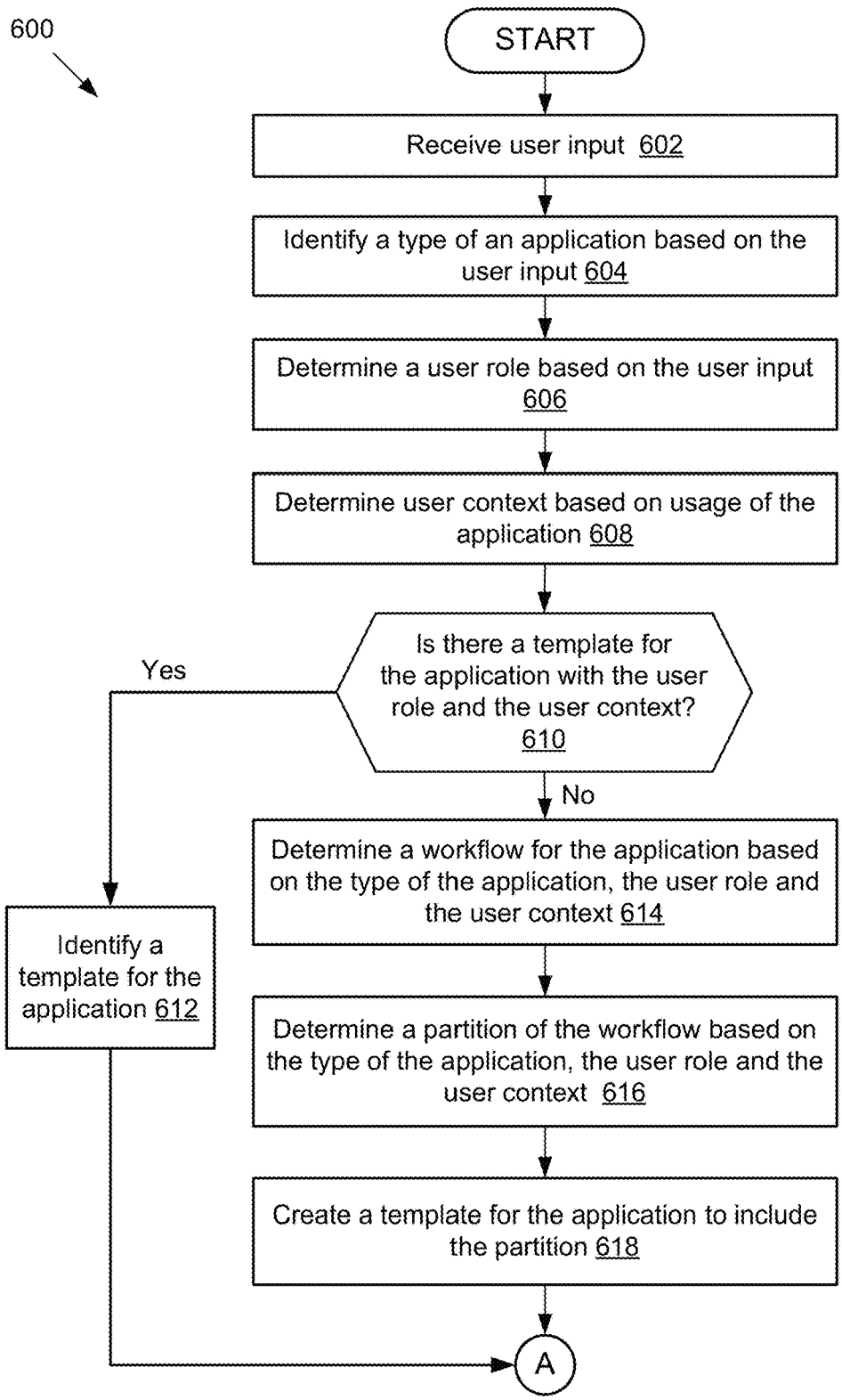
FIGS. 6A and 6B depict a flow diagram illustrating one embodiment of a method for allocating a workflow for an application between a server and a client based on user context in usage of the application, and customizing user views based on the execution of the workflow.
Figure 6B:
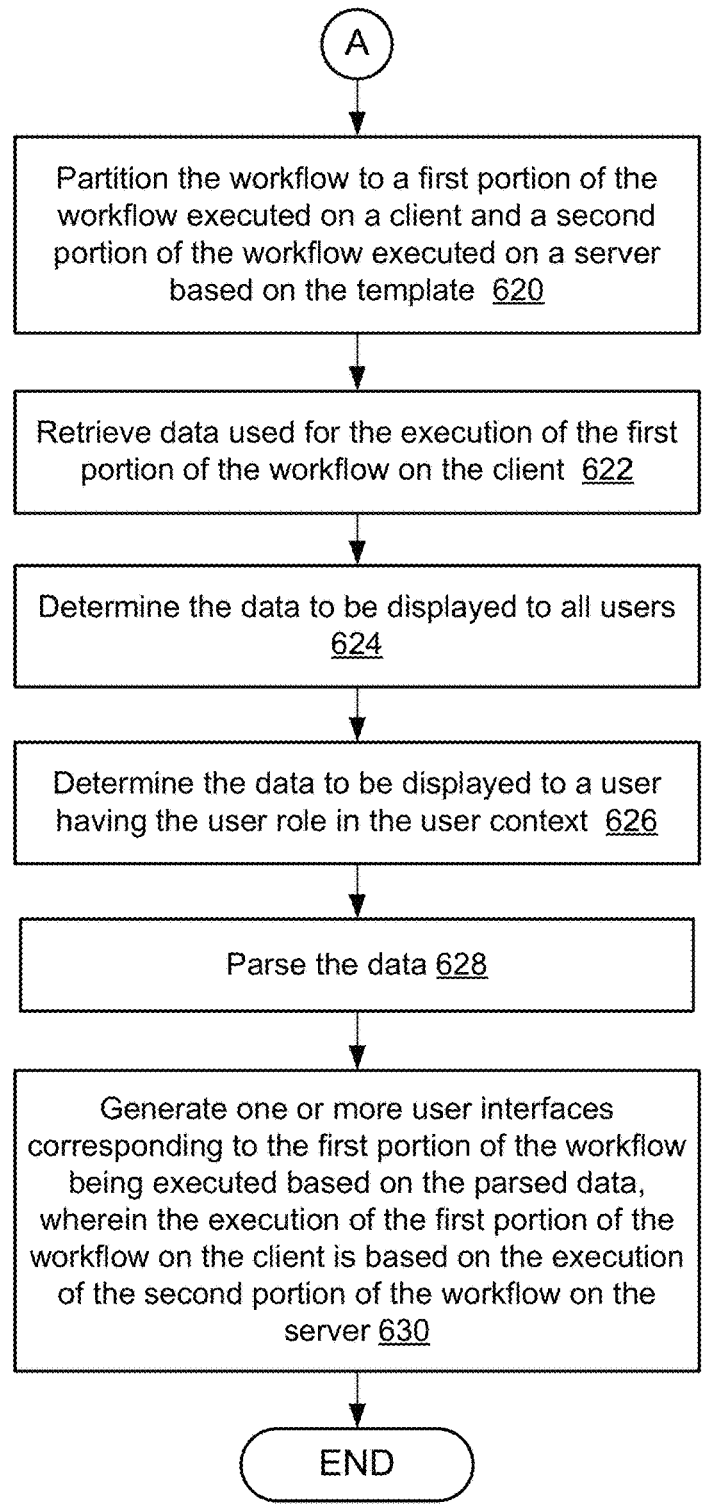

FIGS. 6A and 6B are a flow diagram 600 illustrating one embodiment of a method for allocating a workflow for an application between a server and a client based on user context determined by usage of the application, and customizing user views based on the execution of the workflow. As described above, the customization module 117 may include an application identifier 203, a context module 205, a workflow module 207, a partition module 209, a template module 211, and a user interface engine 213. In FIG. 6A, the application identifier 203 receives 602 user input and identifies 604 a type of an application based on the user input. At 606, the context module 205 determines a user role based on the user input. At 608, the context module 205 determines user context based on usage of the application. At 610, the template module 211 determines whether there is a template for the application with the user role and the user context. If the template module 211 identifies a template for the application, the method continues at 620 as described below. If a template for the application does not exist, at 614, the template module 211 communicates with the workflow module 207 to determine a workflow for the application based on the type of the application, the user role and the user context. At 616, the template module 211 communicates with the partition module 209 to determine a partition of the workflow based on the type of the application, the user role and the user context. At 618, the template module 211 creates a template for the application including the partition of the workflow.

Now referring to FIG. 6B, the partition module 209 partitions 620 the workflow to a first portion of the workflow executed on a client and a second portion of the workflow executed on a server based on the template. At 622, the partition module 209 retrieves data used for the execution of the first portion of the workflow on the client. At 624, the partition module 209 determines the data to be displayed to all users. At 626, the partition module 209 determines the data to be displayed to a user having the user role in the user context. At 628, the partition module 209 parses the data. At 630, the user interface engine 213 generates one or more user interfaces corresponding to the execution of the first portion of the workflow based on the parsed data, wherein the execution of the first portion of the workflow on the client is based on the execution of the second portion of the workflow on the server.

Figure 7A:
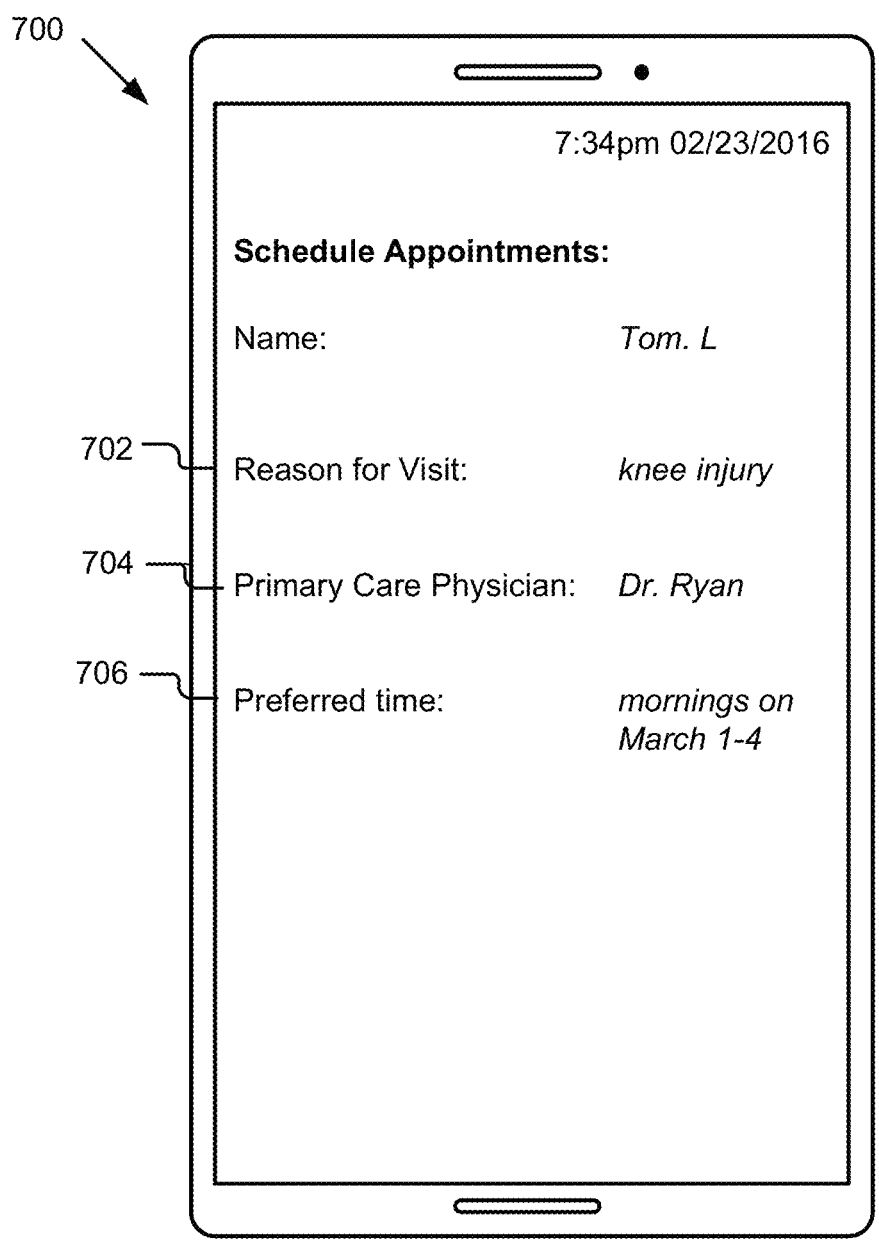
FIG. 7A depicts a graphical representation of one embodiment of a user interface for scheduling an appointment using a mobile device.

FIG. 7A is a graphical representation of an example user interface 700 for scheduling an appointment using a mobile device. In addition to the name of patient Tom. L, only three pieces of information: "reason for visit" 702, "primary care physician" 704, and "preferred time" are listed on the user interface of the mobile phone of Tom. L for him to schedule an appointment with Dr. Ryan.

Figure 7B:
FIG. 7B depicts a graphical representation of one embodiment of a user interface for scheduling an appointment using a computer device.

FIG. 7B is a graphical representation of an example user interface 750 for scheduling an appointment using a computer device. Compared to the user interface 700 of FIG. 7A, Tom. L is shown more information when using the computer device to schedule the appointment with Dr. Ryan. For example, the user interface 750 includes "unavailable time" 754 and a link 756 to Dr. Ryan's office, which reduce the chance that Tom gets a bad time slot and therefore enhances Tom's experience by customizing user interfaces.

A system and method for allocating a workflow for an application between a server and a client based on user context in usage of the application, and customizing user views based on the execution of the workflow has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware.

However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a non-transitory computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving, by one or more processors, user input from a client in a first domain;
   identifying, by the one or more processors, a type of an application based on the user input;
   determining, by the one or more processors, a workload capability of the client;
   determining, by the one or more processors, a workflow for the application based on the type of the application;
   identifying, by the one or more processors, a plurality of core capabilities for performing the workflow for the application, wherein the plurality of core capabilities include a foundation component that includes an external service gateway for communicating with an external entity on the type of the application, a domain component that includes a list of internal domains for comparing with the first domain to adjust steps of the workflow based on the comparison result, and a view component that includes a customizable view;
   dividing, by the one or more processors, the workflow into a first subset of steps to be executed on the client and a second subset of steps to be executed by the one or more processors, wherein:
      the first subset of steps of the workflow is determined by the workload capability of the client, and
      the second subset of steps of the workflow is determined by geographically applicable guidelines mandated for the workflow;
   executing, by the one or more processors, the second subset of steps of the workflow;
   transmitting, by the one or more processors, the core capabilities to the client for executing the first subset of steps of the workflow for the application; and
   receiving, by the one or more processors and from the client, a result of the first subset of steps of the workflow.

2. The computer-implemented method of claim 1, further comprising:
   determining a user role based on the user input;
   determining user context in usage of the application; and
   wherein determining the workflow for the application is also based on the user role and the user context.

3. The computer-implemented method of claim 2, further comprising:
   determining whether there is a template for the application; and
   in response to determining that the template for the application does not exist, creating the template for the application, wherein the template includes the plurality of core capabilities based on the type of the application, the user role, and the user context.

4. The computer-implemented method of claim 1, further comprising:
   retrieving data used for the execution of the workflow on the client; and
   parsing the data for the execution of the workflow on the client.

5. The computer-implemented method of claim 1, further comprising updating the first subset or the second subset of steps of the workflow based on a change of the workflow.

6. The computer-implemented method of claim 1, further comprising modifying the workflow responsive to at least one of a failure, a recovery, and a rollback of the execution of the first subset of steps of the workflow on the client.

7. A system comprising:
   one or more processors; and
   a memory, the memory storing instructions, which when executed cause the one or more processors to:
      receive user input from a client in a first domain;
      identify a type of an application based on the user input;
      determine a workload capability of the client;
      determine a workflow for the application based on the type of the application;
      identify a plurality of core capabilities for performing the workflow for the application, wherein the plurality of core capabilities include a foundation component that includes an external service gateway for communicating with an external entity on the type of the application, a domain component that includes a list of internal domains for comparing with the first domain to adjust steps of the workflow based on the comparison result, and a view component that includes a customizable view;
      divide the workflow into a first subset of steps to be executed on the client and a second subset of steps to be executed by the one or more processors, wherein:
         the first subset of steps of the workflow is determined by the workload capability of the client, and
         the second subset of steps of the workflow is determined by geographically applicable guidelines mandated for the workflow;
      execute the second subset of steps of the workflow;
      transmit the core capabilities to the client for executing the first subset of steps of the workflow for the application; and
      receive, from the client, a result of the first subset of steps of the workflow.

8. The system of claim 7, wherein to determine the workflow for the application, the instructions cause the one or more processors to:
   determine a user role based on the user input; and
   determine user context in usage of the application.

9. The system of claim 8, wherein the instructions cause the one or more processors to:
   determine whether there is a template for the application; and
   in response to determining that the template for the application does not exist, create the template for the application, wherein the template includes the plurality of core capabilities based on the type of the application, the user role, and the user context.

10. The system of claim 7, wherein the instructions cause the one or more processors to:
    retrieve data used for the execution of the workflow on the client; and
    parse the data for the execution of the workflow on the client.

11. The system of claim 7, wherein the instructions cause the one or more processors to update the first subset or the second subset of steps of the workflow based on a change of the workflow.

12. The system of claim 7, wherein the instructions cause the one or more processors to modify the workflow responsive to at least one of a failure, a recovery, and a rollback of the execution of the first subset of steps of the workflow on the client.

13. A computer program product comprising a non-transitory computer readable medium storing a computer readable program, wherein the computer readable program when executed causes a computer to:

receive user input from a client in a first domain;
identify a type of an application based on the user input;
determine a workload capability of the client;
determine a workflow for the application based on the type of the application;
identify a plurality of core capabilities for performing the workflow for the application, wherein the plurality of core capabilities include a foundation component that includes an external service gateway for communicating with an external entity on the type of the application, a domain component that includes a list of internal domains for comparing with the first domain to adjust steps of the workflow based on the comparison result, and a view component that includes a customizable view;
divide the workflow into a first subset of steps to be executed on the client and a second subset of steps to be executed by the computer, wherein:
the first subset of steps of the workflow is determined by the workload capability of the client, and
the second subset of steps of the workflow is determined by geographically applicable guidelines mandated for the workflow;
execute the second subset of steps of the workflow;
transmit the core capabilities to the client for executing the first subset of steps of the workflow for the application; and
receive, from the client, a result of the first subset of steps of the workflow.

14. The computer program product of claim 13, wherein to determine the workflow for the application, the computer readable program causes the computer to:
determine a user role based on the user input; and
determine user context in usage of the application.

15. The computer program product of claim 14, wherein the computer readable program causes the computer to:
determine whether there is a template for the application; and
in response to determining that the template for the application does not exist, create the template for the application, wherein the template includes the plurality of core capabilities based on the type of the application, the user role, and the user context.

16. The computer program product of claim 13, wherein to parse data used for the execution of the workflow on the client, the computer readable program causes the computer to update the first subset or the second subset of steps of the workflow based on a change of the workflow.

17. The computer program product of claim 13, wherein the computer readable program causes the computer to modify the workflow responsive to at least one of a failure, a recovery, and a rollback of the execution of the first subset of steps of the workflow on the client.

18. The computer-implemented method of claim 1, wherein the second subset of steps of the workflow includes a user view determined by the workflow and wherein determining the user view is based on the execution of the workflow, a user role, and user context.

19. The computer-implemented method of claim 2, further comprising:
determining whether there is a template for the application; and
in response to determining that the template for the application does exist, transmitting the template to the client for executing the first subset of steps.

* * * * *